3. Sheets. Sheet. 1.

H. L. Randall,
Felting Machine.

No. 1301. Reissued. April. 15. 1862.

3 Sheets. Sheet. 2.

H. L. Randall.

Felting Machine.

No. 1301. Reissued. Apl. 15. 1862.

H. L. Randall,

Felting Machine.

3 Sheets Sheet 3

No. 1301.

Reissued April 15. 1862.

UNITED STATES PATENT OFFICE.

ISRAEL D. CONDIT, OF MILLBURN, NEW JERSEY, ASSIGNEE OF HENRY L. RANDALL, OF ROXBURY, CONNECTICUT.

IMPROVEMENT IN MACHINES FOR FELTING HAT-BODIES.

Specification forming part of Letters Patent No. 17,115, dated April 21, 1857; Reissue No. 1,301, dated April 15, 1862.

*To all whom it may concern:*

Be it known that I, HENRY L. RANDALL, of Roxbury, in the State of Connecticut, have invented a new and useful Improvement in the Machine for Felting or Sizing Hat-Bodies, of which the following is a full, clear, and exact description, reference being had to the accompanying drawings, making part of this specification, in which—

Figure 1:
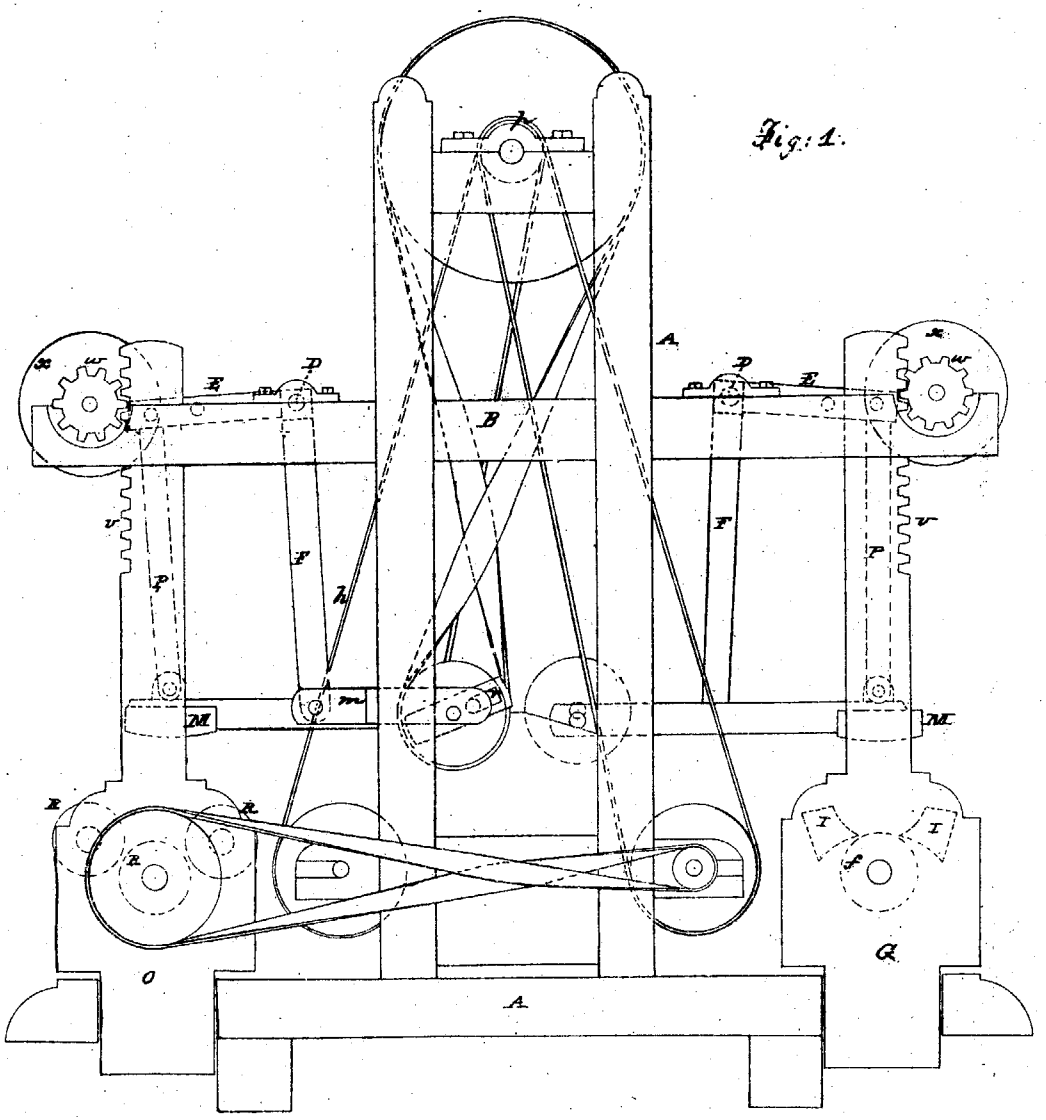
Figure 2:
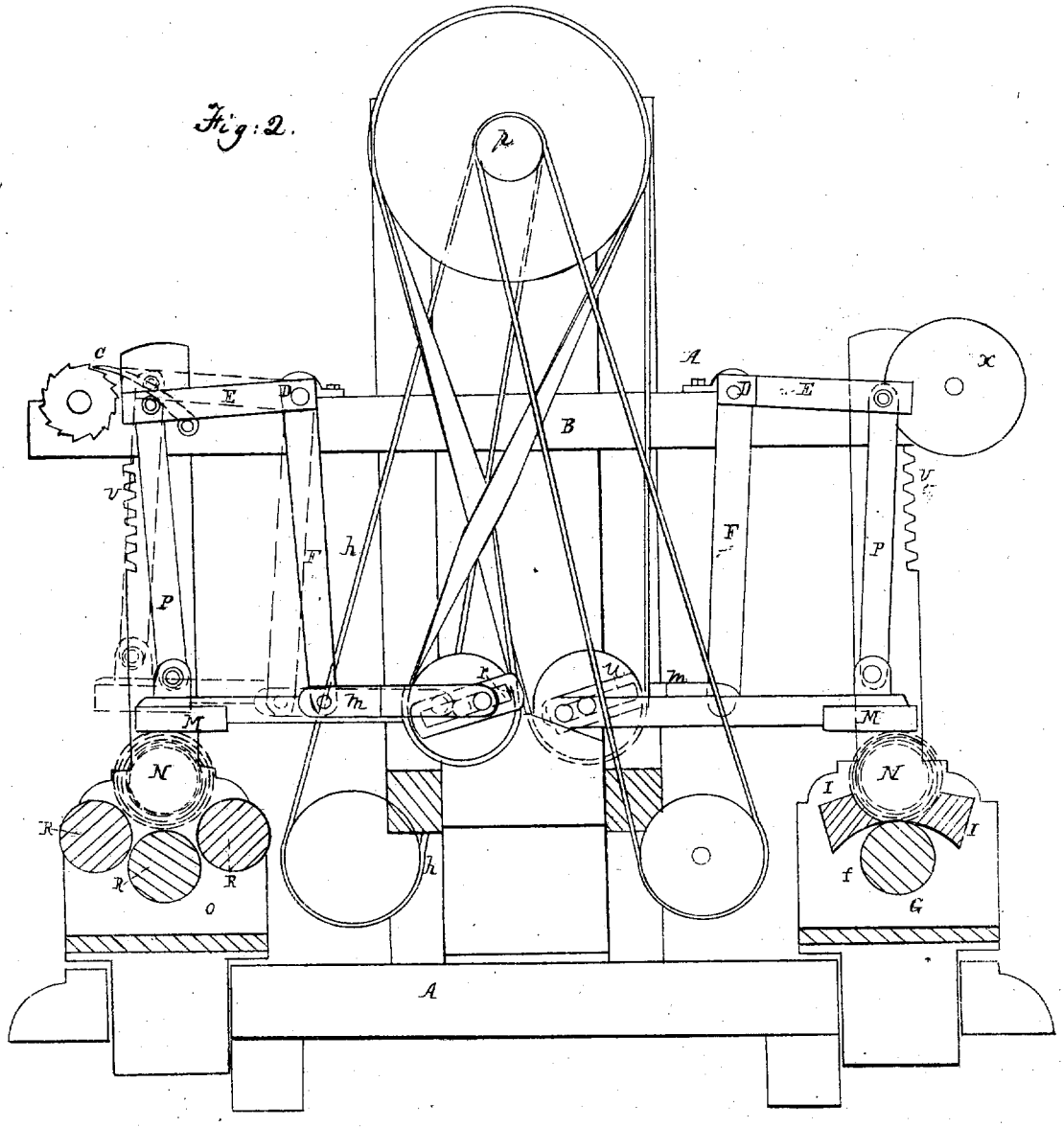
Figure 5:
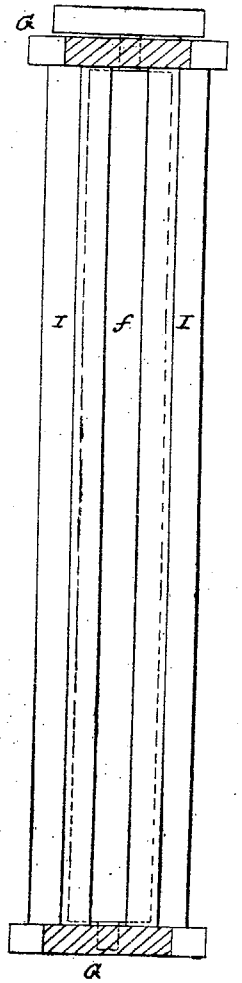
Figure 4:
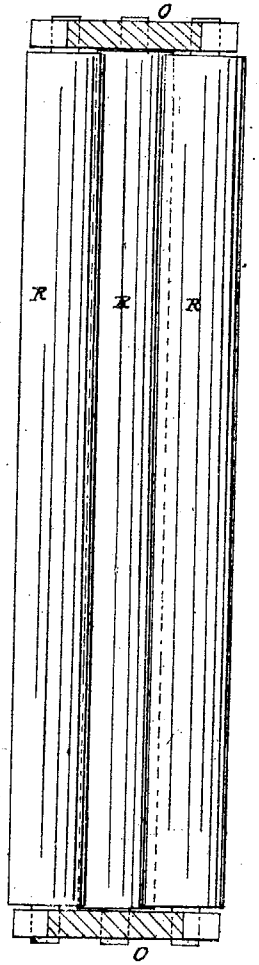
Figure 3:
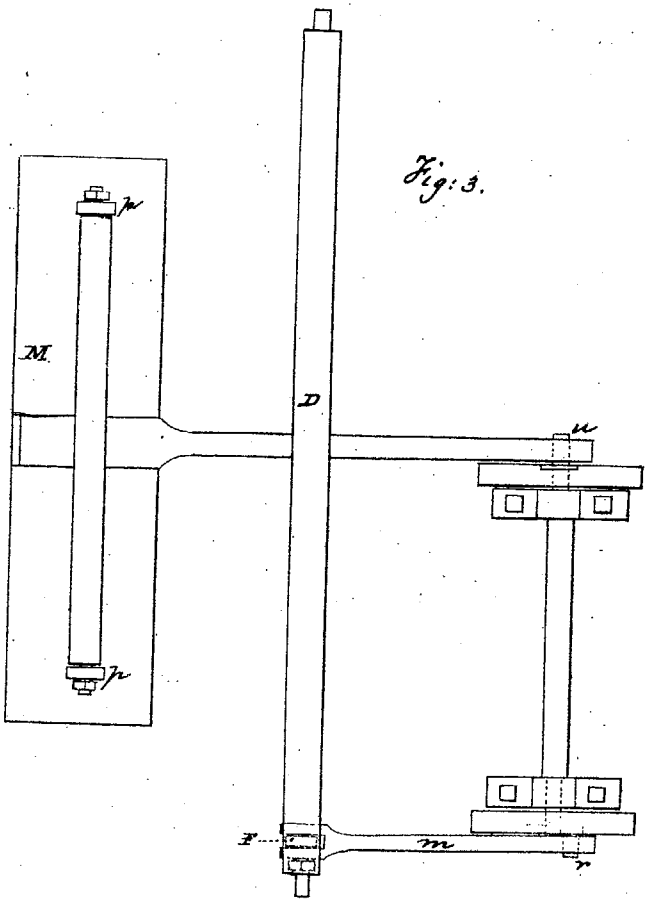

Figure 1 is a side elevation; Fig. 2, a longitudinal vertical section; Fig. 3, a plan of the felting-board and part of its moving mechanism, and Figs. 4 and 5 plan views of the stocks or beds on which the rolls of hat-bodies are placed while being felted.

The same letters indicate like parts in all the figures.

In the operation of felting or sizing hat-bodies by hand the bodies are in a wet state rolled up in a wet cloth, and when so rolled up, and after being dipped in the kettle of hot water, they are felted by a squeezing and rolling motion of the hands on an inclined table. Many machines have been invented and patented with a view to perform this operation automatically, but prior to my invention without marked success. The progress of the operation requires the attention and judgment of the hatter, and from time to time the bodies must be unrolled and "crosed"—that is, the folds changed to obtain a uniform felting.

I know of no machine prior to my said invention in which the roll of hats while undergoing the felting operation is kept constantly in one place and in view of the operator, so that he can conveniently, and during the felting operation, vary the pressure, and hence the force of the felting action of the machine, and in which he can readily and at any period of the action remove the roll of hats for croseing, and replace it. Nor do I know of any prior machine for this purpose in which the felting action has been such as to resemble the operations of the hand in the process of hand felting.

The object which I had in view in producing my said invention, and which I have accomplished, was not only to produce a machine which should have a mode of operation on the roll of hat-bodies analogous to the hands of the operator in sizing by hand, but at the same time so organized that during the entire operation the roll of hat-bodies should remain in the same position and under the eye of the operator, and so that the operator could readily and while the machine continued in operation increase or decrease the force of the felting action, or wholly suspend it, and readily take out and replace the roll of hats.

And to these ends my said invention consists in forming a concave bed for the roll of hat-bodies to turn in without changing place, in combination with a means of squeezing and rolling it in such bed, whereby the roll of hats remain in the same place and under the observation and control of the operator during the operation of the machine on it.

And my said invention also consists in combining with such a bed the mode of operation of the felting-instrument which gradually squeezes while it partially turns the roll on its axis, and then lets go to repeat the operation, thereby acting on the roll in manner analogous to the operation of felting or sizing by hand.

And my said invention also consists in combining, with the concave bed in which the roll of hat-bodies is turned by the felting mechanism or any equivalent therefor, the means or the equivalent thereof for partially resisting the rotation of the roll in the bed, by means of which the roll is kept constantly rolled up tight during the operation of felting, and by means of which also the felting operating is increased while it is made uniform.

And my said invention also consists in combining with the bed a mechanism by which the operator can, during the operation of the machine, vary the degree of pressure on the roll of hat-bodies while felting or entirely suspend it, so that the roll can be taken out or put in.

A in the annexed drawings represents a suitable frame, to which the several parts of the mechanism are secured. To the upper rail B of the frame is arranged a rock-shaft, D, from which shaft extend arms, E E and F. Near the outer ends of the arms E are pivoted rods, P, extending downward, to the lower ends of which rods the felting-board is secured in any convenient manner. The lower end of the arm F is attached to a connecting-rod, *m*, through which a vibrating or swinging motion is given by an adjustable crank, *r*, as shown in Figs. 1, 2, and 3.

By suspending the felting-board M by suitable hinge-joints to the arms P and giving an oscillating motion to the shaft D through the arm F the felting-board will receive an up and-down motion, and by connecting the felting-board by a rod with the adjustable crank *u* a combined motion of up and down and back and forth will be produced. The vertical or up-and-down motion alternately brings the felting-board into contact with and squeezes the roll, and then relieves it, while the back and forth motion gives the partial turn to the roll as it is being squeezed and carries back the board after it has been lifted from the roll.

The crank *r*, by which the felting-board is raised and lowered, should lead the crank *u*, as seen in Fig. 3, so that when said crank *u* is at the extreme backward portion of its circuit the crank *r* will have passed its dead-point and so far advanced in its circuit as to have raised the felting-board off the roll, in order that it may pass over it in its forward motion without coming in contact therewith, and so that it shall depress the felting-board to make pressure on the roll during the back or felting motion, thereby turning the roll always in the same direction, and only while it is under pressure, the effect of which will be to continue to tighten the roll of hats within its wrapper. By these combined motions it will be perceived that the roll receive a short, quick automatic treatment analagous to that given by hand, which in practice is found to be the most perfect way of sizing hat-bodies. These cranks are made adjustable for the purpose of adjusting the stroke of the felting-board to the quality of the hat-bodies. When coarse material is to be sized or felted, a longer stroke and greater pressure is required than with fine hats, and as the quality and kinds of hats are constantly changing, varying from the coarsest to the finest materials, it is found necessary that the stroke of the felting-board be varied to suit these different qualities and kinds.

The machine is represented as double. O G represent two beds, into which the rolls are to be felted or sized. These beds are raised and lowered by means of racks *v* and pinions *w* and hand-wheels *x* to correspond with the varying sizes of the rolls, and are retained in any desired position by ratchet-wheels and pawls, *c*.

The annexed drawings represent two arrangements of the bed. The bed *o* consists of three rollers, R R R, (but more may be used if desired,) which are supported in suitable bearings in the adjustable frame *o*. This bed is intended more particularly for fine hats, as there is less friction and resistance in working the roll over these rollers, which turn with it, than in the bed G, about to be described. The bed G consists of two stationary concaves, I, and one or more rollers, *f*, placed between them. This form of bed is used chiefly in sizing coarse hat-bodies, because more resistance is offered by the stationary concaves and one or more rollers than by a number of rollers arranged in curves, as in the bed *o*, which is desirable in coarse hats, in order to give solidity and equality to the work and to size the bodies as rapidly as the material will permit. A rotating motion is given to the rollers R in the bed *o* by a belt, *h*, from pulley *p* on the main driving-shaft, and motion to the roller *f* in the bed G is also given by corresponding pulleys and belt.

The object of giving motion to these rollers, which compose, or in part compose, the beds is to assist the felting-boards in turning the roll of hat-bodies or other material so that it shall not become flattened and remain in one position.

From the foregoing it will be seen that by reason of the rolling motion given to the roll of hat-bodies while it is compressed, in connection with the partial resistance to such turning presented by the bed, and which may be varied for different qualities of hat-bodies, not only is the felting action rendered efficient and uniform, but the roll is gradually rolled up tight, the greater the resistance of the bed to the rotation of the roll the more active will be the felting action.

And although I have only described and represented one mode of application of my said invention, I do not wish to be limited to such mode as other and equivalent or improved modes of application may be devised, involving the same principle or mode of operation.

What I claim as my invention in machinery for felting or sizing hat-bodies, and desire to secure by Letters Patent, is—

1. A concave bed for the roll of hat-bodies to rest and turn in without changing place while being felted, substantially as and for the purpose specified.

2. In combination with such a concave bed, the mode of operation of the felting-instrument, substantially as and for the purpose specified.

3. In combination with such a concave bed, and with the felting-instrument, or the equivalent thereof, the means herein described, or the equivalent thereof, for partially resisting the rotation of the roll of hat-bodies in the said bed, substantially as and for the purpose specified.

4. In combination with the concave bed and the felter, or their equivalents, the mechanism, or the equivalent thereof, for varying the degree of pressure on the roll, and for free access to the bed for putting in or taking out a roll of hat bodies, as set forth.

HENRY L. RANDALL.

Witnesses:

CHARLES BEARDSLEY,
RELUW WOODRUFF.